(12) United States Patent
Cheng

(10) Patent No.: US 10,111,174 B2
(45) Date of Patent: Oct. 23, 2018

(54) INTELLIGENT SWITCH SYSTEM AND CONTROL METHOD

(71) Applicant: NANNING FUGUI PRECISION INDUSTRIAL CO., LTD., Nanning (CN)

(72) Inventor: Ying-Xiang Cheng, Shenzhen (CN)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 165 days.

(21) Appl. No.: 15/232,705

(22) Filed: Aug. 9, 2016

(65) Prior Publication Data

US 2017/0332328 A1 Nov. 16, 2017

(30) Foreign Application Priority Data

May 13, 2016 (CN) .......................... 2016 1 0317459

(51) Int. Cl.
*H04W 52/02* (2009.01)
*H04W 92/02* (2009.01)
(Continued)

(52) U.S. Cl.
CPC ....... *H04W 52/0235* (2013.01); *H04W 92/02* (2013.01); *H04M 1/2535* (2013.01);
(Continued)

(58) Field of Classification Search
CPC . H04W 52/02; H04W 52/0235; H04W 84/14; H04W 84/16; H04W 92/02;
(Continued)

(56) References Cited

U.S. PATENT DOCUMENTS

| 2011/0090818 A1* | 4/2011 | Alexis | ................... H04M 1/725 370/254 |
|---|---|---|---|
| 2013/0127256 A1* | 5/2013 | Kim | ........................ H02J 17/00 307/104 |

(Continued)

FOREIGN PATENT DOCUMENTS

| CN | 1909755 A | 2/2007 |
|---|---|---|
| CN | 102892184 A | 1/2013 |

*Primary Examiner* — Jae Y Lee
*Assistant Examiner* — Jean F Voltaire
(74) *Attorney, Agent, or Firm* — ScienBiziP, P.C.

(57) ABSTRACT

An intelligent switch system with reduced power consumption includes a wireless gateway, single live line intelligent switches, and one load per single live line intelligent switch. The wireless gateway generates wake-up signal, couples the wake-up signal to the alternating current power source network, and sends a control signal to all the intelligent switches. Each switch includes first wireless communication unit with sleep mode and wake-up mode, first wake-up unit, first controller, and switch unit. Every first wireless communication unit in wake-up mode receives the control signal. Every first wake-up unit receives and the wake-up signal to wake-up the first wireless communication unit if the control signal is tailored for that switch. The first controller analyzes the control signal and outputs a switch signal, the switch unit changes the on or off state of the load accordingly. When the switch unit is turned off, the current flowing is less than 50 uA.

18 Claims, 7 Drawing Sheets

(51) Int. Cl.
   *H04W 84/16* (2009.01)
   *H04M 1/253* (2006.01)
   *H04W 92/06* (2009.01)
   *H04M 3/428* (2006.01)

(52) U.S. Cl.
   CPC ............ *H04M 3/428* (2013.01); *H04W 84/16* (2013.01); *H04W 92/06* (2013.01); *Y02D 70/00* (2018.01)

(58) Field of Classification Search
   CPC ..... H04W 92/06; H04M 1/725; H04M 3/428; H04M 1/2535
   USPC .......................................................... 370/311
   See application file for complete search history.

(56) References Cited

U.S. PATENT DOCUMENTS

| | | | |
|---|---|---|---|
| 2013/0134927 A1* | 5/2013 | Park .................... | H04B 5/0037 320/107 |
| 2014/0028354 A1* | 1/2014 | Yao ..................... | H03K 5/1536 327/79 |
| 2014/0175904 A1* | 6/2014 | Li ........................ | H03K 17/941 307/117 |

* cited by examiner

INTELLIGENT SWITCH SYSTEM AND CONTROL METHOD

CROSS-REFERENCE TO RELATED APPLICATIONS

This application claims priority to Chinese Patent Application No. 201610317459.3 filed on May 13, 2016, the contents of which are incorporated by reference herein.

FIELD

The subject matter herein generally relates to switching systems and control, and particularly to an intelligent switch system with sleep mode and wake-up mode, and control method.

BACKGROUND

Most single live line switches just realize local control. If a single live line switch has the function of remote control, a wireless module must be integrated into a single live line switch, which is connected to a load in series. Thus, the current flowing through the wireless module powers the load, and operating current of the wireless module, such as BLUETOOTH, ZIGBEE, is 5 mA to 30 mA, which is unnecessary power consumption. If the load is a lamp, the lamp will be illuminated continuously because of the operating current.

BRIEF DESCRIPTION OF THE DRAWINGS

Implementations of the present technology will now be described, by way of example only, with reference to the attached figures.

DETAILED DESCRIPTION

Figure 1:
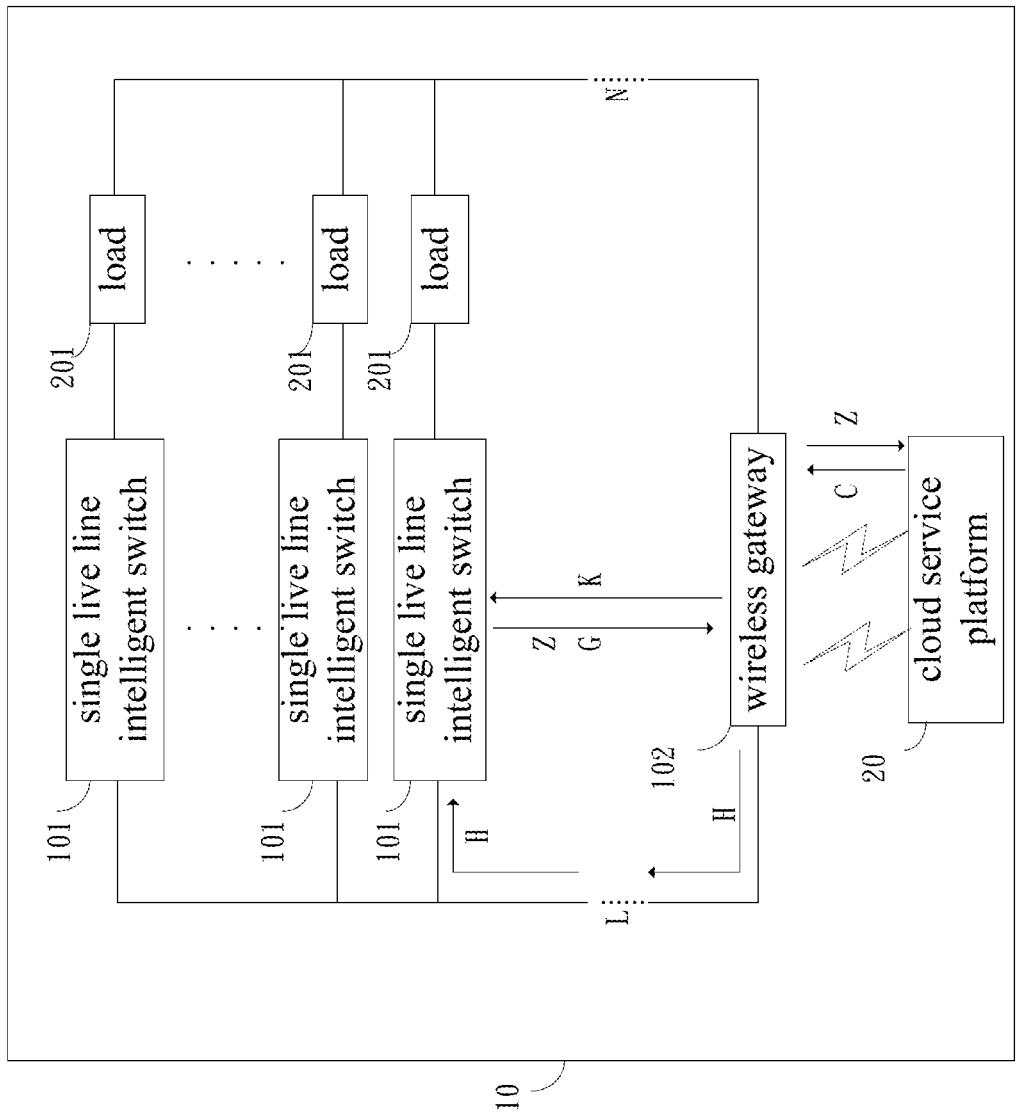
FIG. 1 is a schematic diagram of an embodiment of an intelligent switch system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The disclosure is described in relation to an intelligent switch system and control method.

FIG. 1 illustrates an intelligent switch system 10. In at least one embodiment, the intelligent switch system 10 comprises a plurality of single live line intelligent switches 101, a plurality of loads 201, a wireless gateway 102, and a cloud service platform 20. Each single live line intelligent switch 101 is coupled between one of the loads 201 and live line L in series to power or not power a corresponding load 201. Each load 201 is coupled between a single live line intelligent switch 101 and zero line N in series. In at least one embodiment, each load 201 has a corresponding code, name, and location information. The plurality of loads 201 can be ceiling lamps, exhaust fans, or other electrical equipment.

The wireless gateway 102 is coupled between the live line L and the zero line N in series. The wireless gateway 102 stores a table associating codes, names, and location information corresponding to the plurality of loads 201 and central frequencies corresponding to the codes. The wireless gateway 102 receives and sends a query signal C from the cloud service platform 20.

TABLE 1

| Load | Central frequency | Code | Name | Location |
| --- | --- | --- | --- | --- |
| 1 | f0-1 | 00000000 | ceiling lamp | kitchen |
| 2 | f0-2 | 00000001 | exhaust fan | toilet |
| 3 | f0-3 | 00000010 | ceiling lamp 1 | parlor |
| 4 | f0-3 | 00000011 | ceiling lamp 2 | parlor |
| ... | ... | ... | ... | ... |

As shown in table 1, each of the plurality of loads has the code, name, local information, and the central frequency corresponding to the code. In at least one embodiment, the code is 8 bit binary code, allowing coding for $2^8=256$ loads 201. In other embodiments, the code can be 4 bit binary code or 16 bit binary code, which is determined by the number of the loads 201. The range of the central frequency can be 30 KHz-500 KHz.

The user can send the query signal C to the wireless gateway 102 by using a mobile terminal device via the cloud service platform 20 when the user wants to query the state Z of one of the plurality of loads 201 or change the on or off state of one of the plurality of loads 201. In an exemplary embodiment, the query signal C contains the name and local information of a load 201.

When the wireless gateway 102 receives the query signal C from the cloud service platform 20, the wireless gateway 102 determines the central frequency of the corresponding load 201, according to the table 1 and the query signal C, and generates a wake-up signal H with the central frequency. The wireless gateway 102 couples the wake-up signal H with the central frequency to the alternating current power source network and sends the coupled signal to the plurality of single live line intelligent switches 101.

Each single live line intelligent switch 101 comprises a sleep mode and a wake-up mode. The single live line intelligent switch 101 must be in the wake-up mode for the on or off state of the load 201 to be changed. Each signal live line intelligent switch 101 receives the wake-up signal H with central frequency, but only the signal live line intelligent switch 101 coupled to the corresponding load 201 can be woken up.

For example, when the user wants to query the state Z of ceiling lamp 1 or change the on or off state of ceiling lamp 1, the user can send the query signal C to the wireless gateway 102 by using a mobile terminal device via the cloud service platform 20. The query signal C contains the name and local information of the ceiling lamp 1. The wireless gateway 102 determines that the central frequency of the ceiling lamp 1 is f0-3 according to the query signal C and the table 1. Then the wireless gateway 102 generates a wake-up signal with central frequency f0-3 and couples the wake-up signal to the alternating current power source network. Each signal live line intelligent switch 101 receives the wake-up signal H with central frequency f0-3 from the alternating current power source network, but only the signal live line intelligent switch 101 coupled to the ceiling lamp 1 is woken up by the wake-up signal H with central frequency f0-3. The process of waking up the single live line intelligent switch 101 will be described.

When the single live line intelligent switch 101 is woken up, the single live line intelligent switch 101 sends the on or off state of the load 201 and a control update request signal G to the wireless gateway 102. The wireless gateway 102 feeds back a control signal K to the single live line intelligent switch 101 after receiving the control update request signal G The single live line intelligent switch 101 analyzes the control signal K. When the single live line intelligent switch 101 determines that the control signal K is a request for changing the on or off state of the load 201, the single live line intelligent switch 101 for that load is turned on or off to change the use state. The single live line intelligent switch 101 transmits state Z of the load 201 to the wireless gateway 102, the sleep mode is then entered. When the single live line intelligent switch 101 determines that the control signal K is a request for querying the state Z of the load 201, the single live line intelligent switch 101 transmits the state Z of the load 201 to the wireless gateway 102, then the single live line intelligent switch 101 enters the sleep mode. In at least one embodiment, the state Z contains the load current, the load voltage, the load power, the load temperature, and so on.

For example, if the load 201 is a lamp, when the single live line intelligent switch 101 determines that the control signal K is a request for changing the on or off state of the lamp, the single live line intelligent switch 101 is turned off to cause the lamp to go out (if the lamp is lit) or is turned on to cause the lamp to light (if the lamp is not on). The single live line intelligent switch 101 transmits the state Z of the lamp to the wireless gateway 102, and then the single live line intelligent switch 101 enters the sleep mode. When the single live line intelligent switch 101 determines that the control signal K is a request for querying the state Z of the lamp, the single live line intelligent switch 101 just transmits the state Z of the lamp to the wireless gateway 102, and then enters the sleep mode.

In an exemplary embodiment, the user can change the on or off state of one of the plurality of loads 201 by pressing a local switch (not shown).

Figure 2:
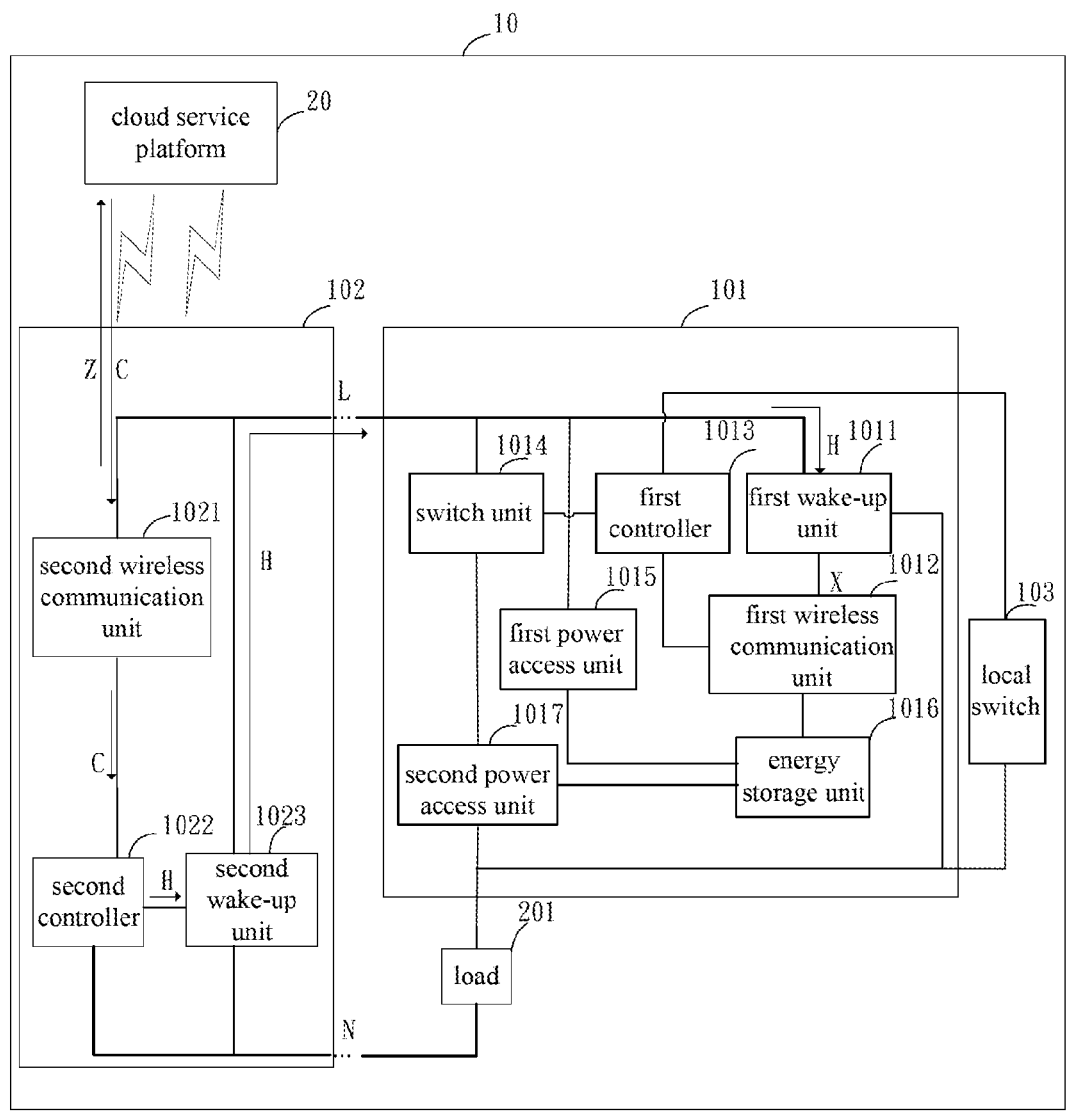
FIG. 2 is a block diagram of an embodiment of the intelligent switch system.

FIG. 2 illustrates the intelligent switch system 10. Each single live line intelligent switch 101 of the intelligent switch system 10 operates in the same way. One single live line intelligent switch 101 and one load 201 are described for the sake of brevity.

The intelligent switch system 10 comprises a single live line intelligent switch 101, a wireless gateway 102, a local switch 103, a load 201, and a cloud service platform 20. The load 201 has a code, a name, and local information. The user can send the query signal C to the wireless gateway 102 by using a mobile terminal device via the cloud service platform 20, when the user wants to query the state Z of the load 201 or change the on or off state of the load 201.

The wireless gateway 102 comprises a second wireless communication unit 1021, a second controller 1022, and a second wake-up unit 1023. The second wireless communication unit 1021 is coupled between the live line L and the second controller 1022. The second wireless communication unit 1021 receives the query signal C from the cloud service platform 20 and transmits the control signal K to the single live line intelligent switch 101. The second controller 1022 is coupled between the zero line N and the second wireless communication unit 1021. The second controller 1022 stores a table associating the code, the name, and the location information corresponding to the load 201 and a central frequency corresponding to the code. The second controller 1022 determines the central frequency of the load 201 according to the query signal C and the table, to generate the wake-up signal H with the central frequency. The second wake-up unit 1023 is coupled to the second controller 1022, live line L and the zero line N. The second wake-up unit 1023 couples the wake-up signal H with the central frequency generated by the second controller 1022 to the alternating current power source network, in order to send the wake-up signal with the central frequency to the single live line intelligent switch 101.

The single live line intelligent switch 101 comprises a first wake-up unit 1011, a first wireless communication unit 1012, a first controller 1013, and a switch unit 1014. The first wake-up unit 1011 is coupled between the live line L and the first wireless communication unit 1012. The first wake-up unit 1011 receives wake-up signal H with the central frequency from the alternating current power source network, and converts the wake-up signal H with central frequency into a resonance voltage signal X, to wake up the first wireless communication unit 1012. The first wireless communication unit 1012 comprises a sleep mode and a wake-up mode. When the first wireless communication unit 1012 is in the sleep mode, the first wireless communication unit 1012 does not work. When the first wireless communication unit 1012 is woken up by the resonance voltage signal X from the first wake-up unit 1011, the first wireless communication unit 1012 transmits the use state of the load 201 and the control update request signal G to the second wireless communication unit 1021. The second wireless communication unit 1021 feeds back the control signal K to the first wireless communication unit 1012 when the second wireless communication unit 1021 receives the control update request signal G from the first wireless communication unit 1012. The process of converting the wake-up signal H into the resonant voltage signal X will be described.

The first controller 1013 is coupled between the first wireless communication unit 1012 and the switch unit 1014. The first controller 1013 analyzes the control signal K from the first wireless communication unit 1012 and outputs a switch signal to control the switch unit 1014 to turn on or off. The switch unit 1014 is coupled between the load 201 and the live line L. The on or off state of the load 201 is changed by the switch unit 1014 turning on or off, according to the switch signal output by the switch unit 1014.

When the first controller 1013 determines that the control signal K is the request for changing the on or off state of the load 201, the first controller 1013 outputs the switch signal to control the switch unit to turn on or off to change the on or off state of the load 201. The single live line intelligent switch 101 transmits the state Z of the load 201 to the second wireless communication unit 1021, and then enters the sleep mode. When the first controller 1013 determines that the control signal K is a request for querying the state Z of the load 201, the first wireless communication unit 1012 transmits the state Z of the load 201 to the second wireless communication unit 1021, and then enters the sleep mode. The second wireless communication unit 1021 feeds back the state Z of the load 201 to the user by the cloud service platform 20. In at least one embodiment, the state Z contains the load current, the load voltage, the load power, the load temperature, and so on.

In at least one embodiment, the intelligent switch system 10 may comprise a local switch 103. The local switch 103 is coupled between the load 201 and the first controller 1013. When the first controller 1013 detects one press on the local switch 103, the first controller 1013 outputs the switch signal to control the switch unit 1014 to turn on or off, in order to change the on or off state of the load 201.

The single live line intelligent switch 101 further comprises a first power access unit 1015, a second power access unit 1017, and an energy storage unit 1016. The energy storage unit 1016 is coupled to the first wireless communication unit 1012 to supply power to the first wireless communication unit 1012 in the wake-up mode. The first power access unit 1015 is coupled to the live line L and the energy storage unit 1016 to charge the energy storage unit 1016. The second power access unit 1017 is coupled to the switch unit 1014, the energy storage unit 1016, and the load 201. When the switch unit 1014 is turned on, both the first power access unit 1015 and the second power access unit 1017 charge the energy storage unit 1016.

The first wireless communication unit 1012 is powered by the energy storage unit 1016 to avoid being powered by the live line L directly. When the switch unit 1014 is turned off, the current flowing through the load is less than 50 uA, which reduces power consumption. Moreover, if the load 201 is a lamp, the phenomenon of flashing can be avoided.

Figure 3:
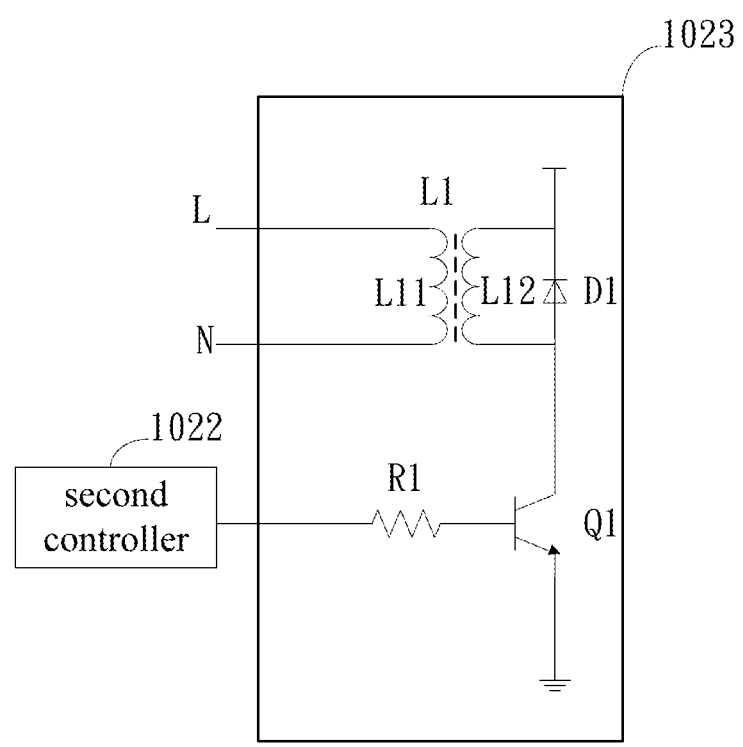
FIG. 3 is a circuit diagram of an embodiment of a second wake-up unit of the intelligent switch system of FIG. 1.

FIG. 3 illustrates a circuit diagram of the second wake-up unit 1023 of FIG. 1. The second wake-up unit 1023 comprises a first resistor R1 with a first resistor first end and a first resistor second end, a first electrical switch Q1 with a first electrical switch first end, a first electrical switch second end, and a first electrical switch control end, a first diode D1 with a first diode anode and a first diode cathode, and a first coupling coil L1 with a first coil L11 and a second coil L22. The first resistor first end is coupled to the second controller 1022, and the first resistor second end is coupled to the first electrical switch control end. The first electrical switch first end is coupled to the first diode anode and the first electrical second end is coupled to ground. Both the first coil L11 and the second coil L22 comprise a first end and a second end. The first coil first end is coupled to the first diode anode and the first coil second end is coupled to the first diode cathode. The second coil first end is coupled to the live line L, and the second coil second end is coupled to the zero line N. In an exemplary embodiment, the first electrical switch is a triode.

When the second controller 1022 generates the wake-up signal H with the central frequency, voltage on the first electrical switch control end is greater than the voltage on the first electrical switch second end. The first electrical switch Q1 is thus turned on, then the wake-up signal H with the central frequency is coupled to alternating current power source network by the first coil and the second coil after freewheeling by the first diode D1, in order to transmit the wake-up signal H with the central frequency to the first wake-up unit 1011.

Figure 4:
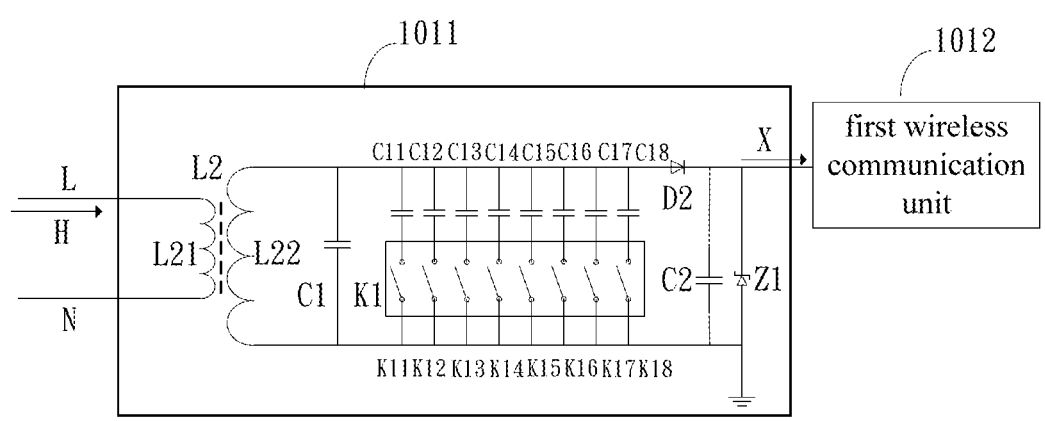
FIG. 4 is a circuit diagram of an embodiment of a first wake-up unit of the intelligent switch system of FIG. 1

FIG. 4 illustrates a circuit diagram of the first wake-up unit 1011 of FIG. 1. The first wake-up unit 1011 comprises a first capacitor C1 with a first capacitor first end and a first capacitor second end, a second coupling coil L2 with a third coil L21 and a fourth coil L22, and a coding switch K1. Both the third coil L21 and the fourth coil L22 comprise a first end and a second end. The third coil first end is coupled to the live line L and the third coil second end is coupled to the zero line N. The fourth coil first end is coupled to ground. The first capacitor first end is coupled to the third coil first end, and the first capacitor second end is coupled to ground. In at least one embodiment, the coding switch corresponds to the codes corresponding to the plurality of loads 201. If the codes corresponding to the plurality of loads 201 are 4 bit binary codes, the coding switch K1 is a 4 bit coding switch. Similarly, if the codes corresponding to the plurality of loads 201 are 8 bit binary codes, the coding switch K1 is an 8 bit coding switch.

In an exemplary embodiment, the coding switch K1 is an 8 bit coding switch, which comprises 8 electrical switches K11-K18. A first end of each of the electrical switches K11-K18 is coupled to one of capacitors C11-C18 and a second end is coupled to ground. In other embodiments, the first wake-up unit 1011 further comprises a second diode D2 with a second diode anode and a second diode cathode, a second capacitor C2 with a second capacitor first end and a second capacitor second end, and a zener diode Z1 with a zener diode anode and a zener diode cathode. The second diode anode is coupled to the first capacitor first end and the second diode cathode is coupled to the second wireless communication unit 1021. The second capacitor first end is coupled to the second diode cathode and the second capacitor second end is coupled to ground. The zener diode cathode is coupled to the second diode cathode and the zener diode anode is coupled to ground.

In an exemplary embodiment, the states of the electrical switches K11-K18 are coded and the turned-on and turned-off states are expressed as binary values. The turned-on state is expressed as binary value 1, the turned-off state is expressed as binary value 0. Each of the plurality of loads 201 corresponds to a coding switch K1. The coding switch is set up in advance according to the code corresponding to the load 201 during installation, so that the response frequency of the first wake-up unit 1011 is equal to the central frequency of the corresponding load 201. For example, according to the table 1, the binary code of the ceiling lamp 1 is 000000010 and the central frequency of the ceiling lamp 1is f03. Thus, the electrical switched K11-K16 and K18 are set of turn off, to disconnect the capacitors C11-C16 and C18, and the electrical switch K17 is set to turn on to connect the capacitor C17 during the installation, which makes the resonant frequency of the firs wake-up unit 1011 equal to the central frequency f03.

When the second wake-up unit 1023 couples the wake-up signal H with the central frequency to the alternating current power source network, the first wake-up unit 1011 of each of the plurality of single live line intelligent switches 101 is able to receive the wake-up signal H with the central frequency. The third coil L21 couples the wake-up signal H with the central frequency to the fourth coil L22. However, only the first wake-up unit 1011 that has the resonant frequency equal to the central frequency of the wake-up signal H is able to convert the wake-up signal H into the resonant voltage signal X, to wake up the first wireless communication unit 1012. When the resonant frequency of the first wake-up unit 1011 is equal to the central frequency of the wake-up signal H, the voltage on the fourth coil L22 reaches the maximum. The maximum voltage is the resonant voltage signal X rectified by the second diode D2, filtered by the second capacitor C2, and clamped by the zener diode Z1. In an exemplary embodiment, the formula for the resonant frequency of the first wake-up unit 1011 is $$f0 = \frac{1}{2\pi\sqrt{LC}}$$

L expresses the inductance value of the fourth coil L22, C expresses parallel capacitance value of the first capacitor C1 and of the certain capacitor of the capacitors C11-C18 selected by the first coding switch K1 in accord with the 8 bit binary code corresponding to the central frequency.

Figure 5:
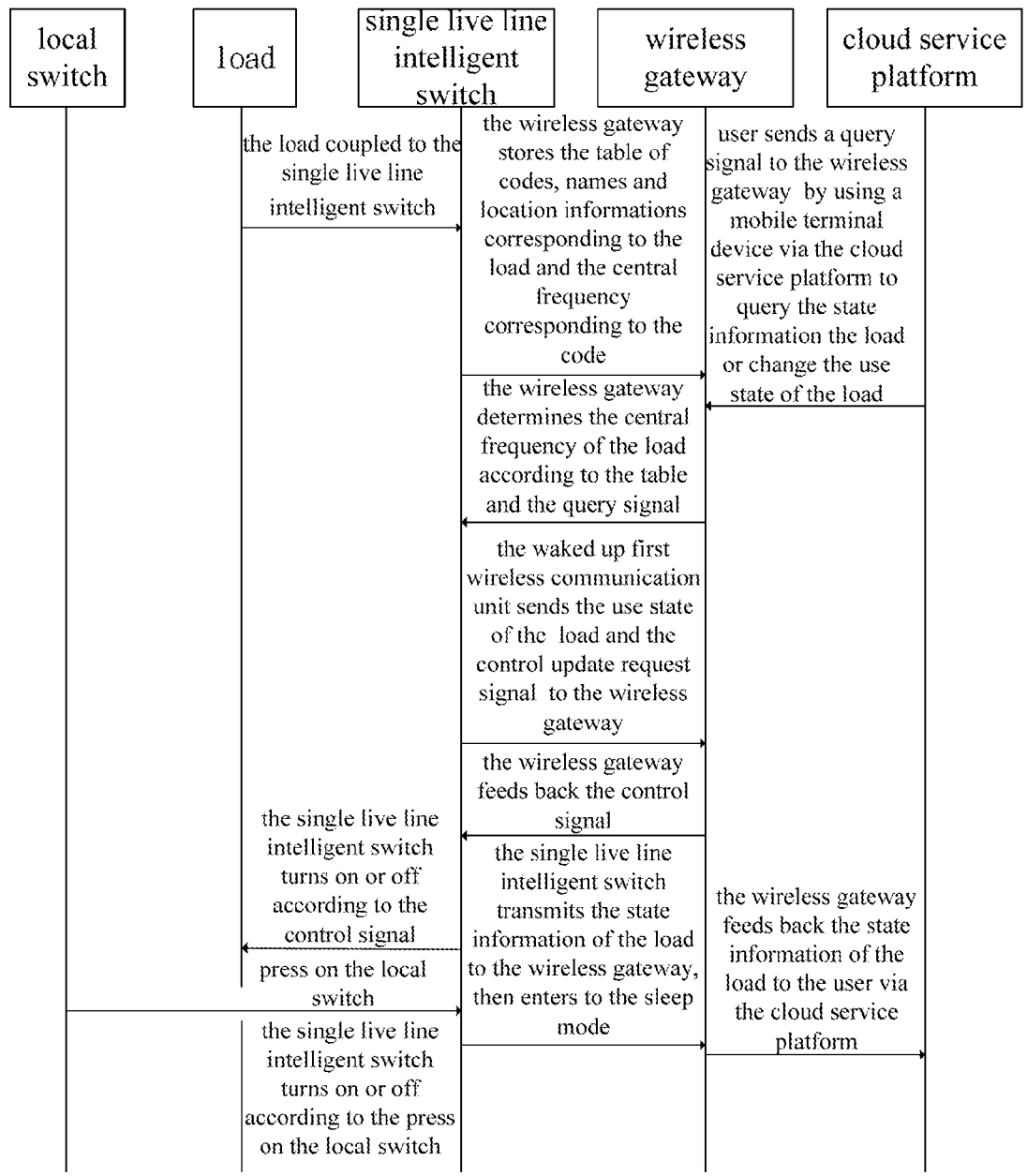
FIG. 5 is a system flow diagram of the intelligent switch system of FIG. 1.

FIG. 5 illustrates a system flow diagram of the intelligent switch system 10. The user sends the query signal C to the wireless gateway 102 by using a mobile terminal device via the cloud service platform 20 to query the state Z of one of the plurality of loads 201, or to change the on or off state of one of the plurality of loads 201. Each of the plurality of loads 201 has the code, the name, and the location information. The wireless gateway 102 stores the table associating codes, names, and location information corresponding to the plurality of loads and the central frequencies corresponding to the codes. In an exemplary embodiment, the query signal C contains the name and local information of the load 201.

The wireless gateway 102 determines the central frequency of the load 201 according to the table 1 and the query signal C from the cloud service platform 20 and generates the wake-up signal H with central frequency. The wireless gateway 102 couples the wake-up signal H with central frequency to the alternating current power source network to send the coupled signal to the plurality of single live line intelligent switches 101.

When the single live line intelligent switch 101 is woken up, the single live line intelligent switch 101 sends the use state of the load and the control update request signal G to the wireless gateway 102.

The wireless gateway 102 feeds back the control signal K to the single live line intelligent switch 101 after receiving the control update request signal G The single live line intelligent switch 101 analyzes the control signal K to change the on or off state of the load 201 or query the state Z of the load 201. The single live line intelligent switch 101 transmits the state information Z of the load 201 to the wireless gateway 102, and then enters the sleep mode.

The wireless gateway 102 feeds back the state information Z of the load 201 to the user via the cloud service platform 20. The state information Z contains the load current, the load voltage, the load power, the load temperature, and so on.

Figure 6:
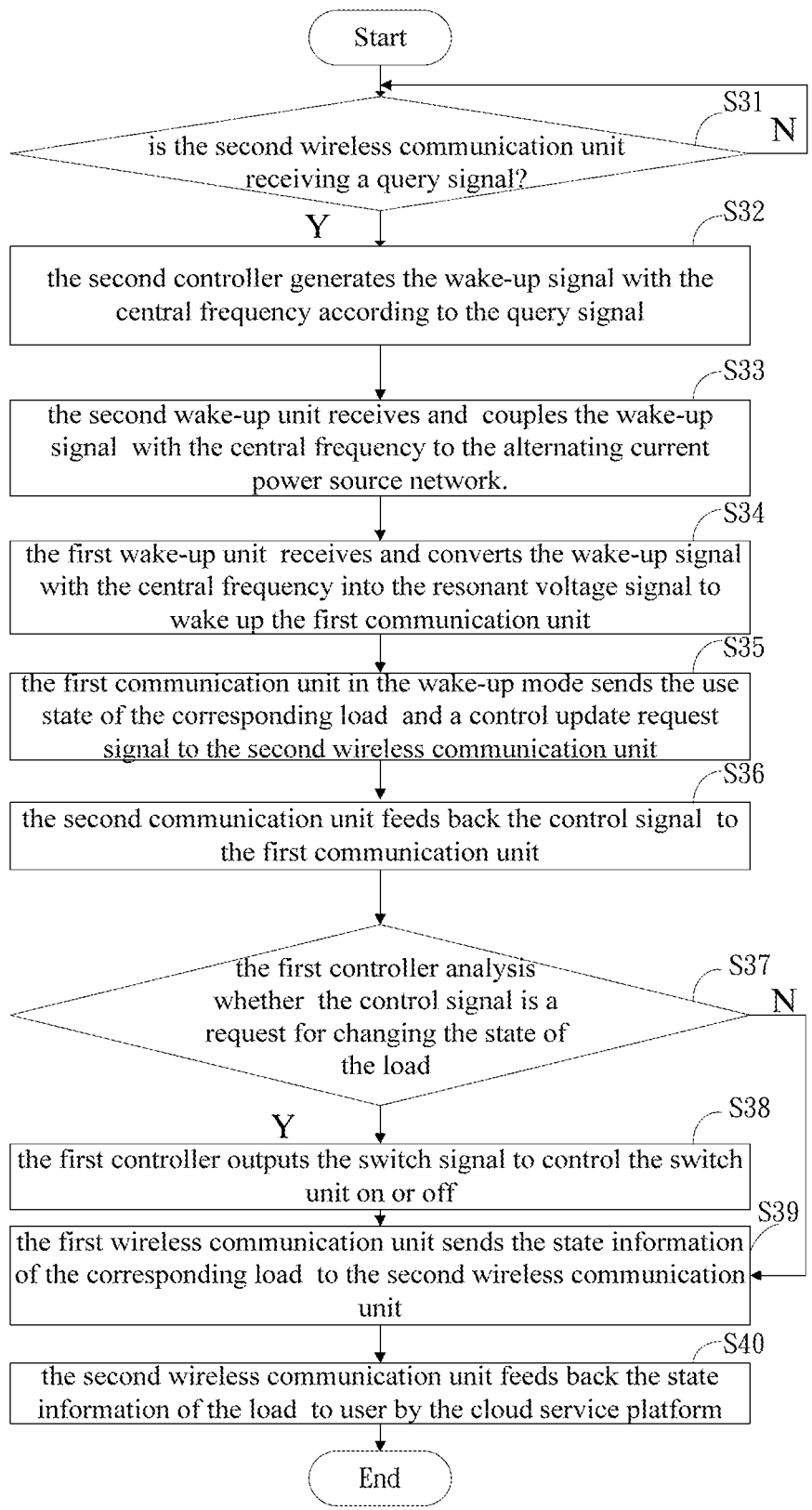
FIG. 6 is a flowchart showing a control method for the intelligent switch system of FIG. 1.

FIG. 6 illustrates a flowchart showing a control method for the intelligent switch system 10. The intelligent switch system 10 comprises the cloud service platform 20, the wireless gateway 102, the plurality of single live line intelligent switches 101, and the plurality of loads 201. Each single live line intelligent switch 101 comprises the first wake-up unit 1011, the first wireless communication unit 1012, the first controller 1013, the switch unit 1014, the energy storage unit 1016, the first power access unit 1015, and the second power access unit 1017. The wireless gateway 102 comprises the second controller 1022, the second wireless communication unit 1021, and the second wake-up unit 1023. The control method comprises the following steps.

Step S31, the second wireless communication unit 1021 detects whether the cloud service platform 20 sends the query signal C to query the state of one of the plurality of loads 201 or change the use state of one of the plurality of loads 201.

Step S32, when the second wireless communication unit 1021 receives the query signal C, the second controller 1022 generates the wake-up signal H with the central frequency according to the query signal C and the table 1, and sends the wake-up signal H with the central frequency to the second wake-up unit 1023. The query signal C contains the name and local information of the corresponding load 201.

Step S33, the second wake-up unit 1023 couples the wake-up signal H with the central frequency generated by the second controller 1022 to the alternating current power source network.

Step S34, the first wake-up unit 1011 receives the wake-up signal H with the central frequency from the alternating current power source network, and converts the wake-up signal H with the central frequency into the resonant voltage signal X to wake up the first wireless communication unit 1012 in the sleep mode. Only the first wake-up unit 1011 that the resonant frequency equal to the central frequency of the wake-up signal H is able to convert the wake-up signal H into the resonant voltage signal X to wake up the corresponding first wireless communication unit 1012.

Step S35, the first wireless communication unit 1012 in the wake-up mode sends the use state of the corresponding load 201 and the control update request signal G to the second wireless communication unit 1021. In at least one embodiment, the first wireless communication unit 1012 is powered by the energy storage unit 1016. When the switch unit 1014 is turned on, both the first power access unit 1015 and the second power access unit 1017 charge the energy storage unit 1016. When the switch unit 1014 is turned off, just the first power access unit 1015 charges the energy storage unit 1016.

Step S36, the second wireless communication unit 1021 feeds back the control signal K to the first wireless communication unit 1012 when the second wireless communication unit 1021 receives the control update request signal G from the first wireless communication unit 1012.

Step S37, the first controller 1013 analyzes the control signal K from the first wireless communication unit 1012. If the first controller 1013 determines that the control signal is a request for changing the state of the load 201, the procedure goes to step S38. If the first controller 1013 determines that the control signal is a request for querying the state information Z of the corresponding load 201, the procedure goes to step S39. The state information Z contains the load current, the load voltage, the load power, and the load temperature, and so on.

Step S38, the first controller 1013 outputs the switch signal to control the switch unit 1014 on or off, then the first wireless communication unit 1012 sends the state information Z of the corresponding load 201 to the second wireless communication unit 1021; or Step S39, the first wireless communication unit 1012 sends the state information Z of the corresponding load 201 to the second wireless communication unit 1021, then enters the sleep mode.

Step S40, the second wireless communication unit 1021 receives the state information Z of the corresponding load 201 and feeds back the state information Z of the load 201 to user by the cloud service platform 20.

Figure 7:
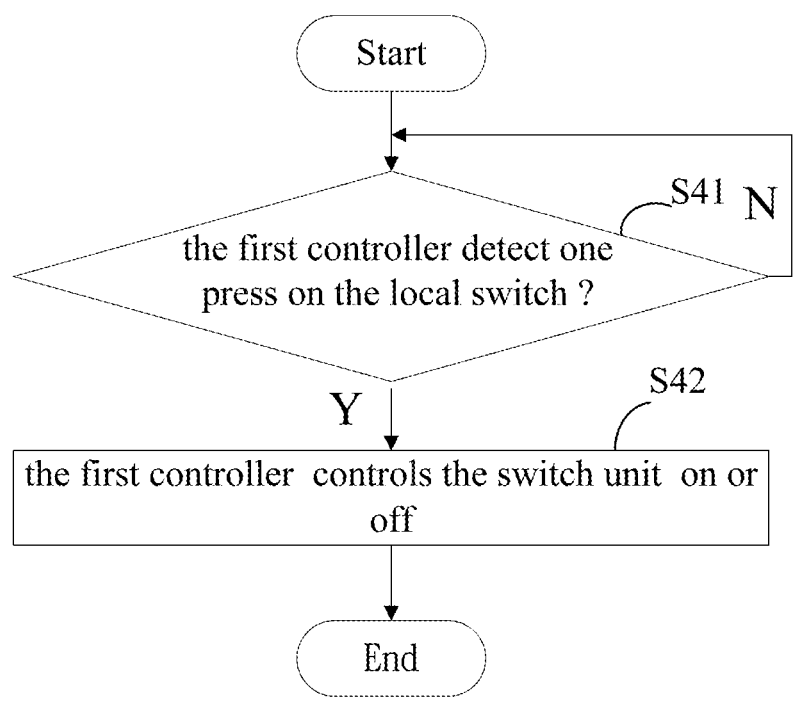
FIG. 7 is a flowchart showing a control method of a local switch in the intelligent switch system of FIG. 1.

FIG. 7 illustrates a flowchart showing a control method for the intelligent switch system 10 of a local switch. The control method of the local switch comprises the following steps:

Step S41, the first controller 1013 detects whether a press on the local switch, if yes, the procedure goes to step S42, otherwise, the procedure continue to step S41.

Step 42, the first controller 1013 controls the switch unit 1014 on or off to change the use state of the corresponding load 201.

In the intelligent switch system 10 and the control method, the wireless gateway 102 sends the wake-up signal H with the central frequency by the alternating current power source network. The first wake-up unit 1011 does not require an external power to convert the wake-up signal H into the resonant voltage X, and the first wireless communication unit 1012 is powered by the energy storage unit 1016 to receive the control signal K. The first controller 1013 control the switch unit 1014 on or off according to the control signal K. When the switch unit 1014 is turned off, the current flowing through the load is less than 50 uA, which avoid unnecessary power consumption. Moreover, if the load 201 is a lamp, the phenomenon of flash can be avoided.

Many details are often found in the art such as the other features of the intelligent switch system 10 and the control method. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An intelligent switch system coupled between a live line and a zero line comprising:
    a plurality of single live line intelligent switches;
    a plurality of loads, wherein each single live line intelligent switch is coupled to one of the plurality of loads in series between the live line and the zero line; and
    a wireless gateway coupled between the live line and the zero line is configured to generate a wake-up signal and couple the wake-up signal to a alternating current power source network formed by the live line and the zero line, and the wireless gateway is further configured to send a control signal to the plurality of single live line intelligent switches;
    wherein each of the single live line intelligent switch comprises:
        a first wireless communication unit with a sleep mode and a wake-up mode, configured to receive the control signal from the wireless gateway;
        a first wake-up unit coupled to the first wireless communication unit, configured to receive the wake-up signal from the alternating current power source network and convert the wake-up signal into resonance voltage signal to wake up the first wireless communication unit in the sleep mode;
        a first controller coupled to the first wireless communication unit, configured to analyze the control signal and output a switch signal; and
        a switch unit coupled between the first controller and a corresponding load, configured to execute on or off to change the on or off state of the load according to the switch signal from the first controller.

2. The intelligent switch system of claim 1, further comprising a cloud service platform configured to send a query signal to the wireless gateway according to instructions from mobile terminal used by user.

3. The intelligent switch system of claim 2, wherein each of the plurality of loads has a corresponding coding, name, and location information.

4. The intelligent switch system of claim 3, wherein the wireless gateway comprises:
    a second wireless communication unit configured to receive the query signal from the cloud service platform;
    a second controller storing a table associating coding, name and a location information corresponding to the plurality of loads and a central frequency corresponding to the coding is configured to identify the central frequency corresponding to one of the plurality of loads, and generate the wake-up signal with the central frequency; and
    a second wake-up unit, coupled to the second controller, configured to couple the wake-up signal generated by the second controller to the alternating current power source network.

5. The intelligent switch system of claim 1, wherein the first wireless communication unit is further configured to send the use state of a corresponding load and a control update request signal to a second wireless communication unit when the first wireless communication unit is woken up by the first wake-up unit; and
    the second wireless communication unit is further configured to receive the control update request signal from the first wireless communication unit and feedback the control signal to the first wireless communication unit.

6. The intelligent switch system of claim 5, wherein the first controller is further configured to analyze the control signal;
    when the first controller determines that the control signal is a request for changing the on or off state of the corresponding load, the first controller outputs the switch signal to control the switch unit on or off, then the first wireless communication unit sends a state information of the corresponding load to the second wireless communication unit;
    when the first controller determines that the control signal is a request for querying the state information of the corresponding load, the first wireless communication unit sends the state information of the corresponding load to the second wireless communication unit;
    wherein the second wireless communication unit feeds back the use state of the corresponding load to user by a cloud service platform.

7. The intelligent switch system of claim 1, further comprising a local switch coupled between the first controller and one of the plurality loads, wherein when the first controller detects one press on the local switch, the first controller control the switch unit on or off to change the on or off state of the corresponding load.

8. The intelligent switch system of claim 1, wherein the single live line intelligent switch further comprises:
   an energy storage unit coupled to the first wireless communication unit, is configured to supply power to the first wireless communication unit in the wake-up mode;
   a first power access unit, coupled between the live line and the energy storage unit, is configured to charge the energy storage unit; and
   a second power access unit coupled to the switch unit, the energy storage unit, and the load, wherein when the switch unit keeps on, both the first power access unit and the second power access unit change the energy storage unit.

9. The intelligent switch system of claim 4, wherein the second wake-up unit comprises:
   a first resistor with a first resistor first end, coupled to the second controller, and a first resistor second end;
   a first electrical switch comprising a first electrical switch first end, a first electrical switch second end, and a first electrical switch control end, wherein the first electrical switch control end is coupled to the first resistor second end, and the first electrical switch second end is coupled to ground;
   a first diode comprising a first diode anode and a first diode cathode, wherein the first diode anode is coupled to the first electrical switch first end;
   a first coupling coil comprising a first coil with a first coil first end coupled to the first diode anode, a first coil second end coupled to the first diode cathode, and a second coil with a second coil first end coupled to the live line, a second coil second end coupled to the zero line;
   wherein when the second controller generates the wake-up signal with the central frequency, the first electrical switch is turned on, and the wake-up signal is coupled to the alternating current power source network by the first coil and the second coil, to transmit the wake-up signal with the central frequency to the first wake-up unit.

10. The intelligent switch system of claim 1, wherein the first wake-up unit comprises:
   a second coupling coil comprising a third coil with a third coil first end coupled to the live line, and a third coil second end coupled to the zero line, and a fourth coil with a fourth coil first end coupled to ground and a fourth coil second end;
   a capacitor with a capacitor first end coupled to the fourth coil second end, and a capacitor second end coupled to ground;
   a coding switch comprising a plurality of electrical switches, wherein each electrical switch with a first end coupled to one capacitor and a second end coupled to ground;
   wherein the switching of the each switch is set up according to the coding and a central frequency corresponding to the load, in order to make a resonant frequency of the first wake-up unit consistent with the central frequency of the corresponding load;
   wherein the wake-up signal with the central frequency is coupled to the fourth coil by the third coil, and only the first wake-up unit that the resonant frequency equal to the central frequency of the wake-up signal H converts the wake-up signal into a resonant voltage signal to wake up the first wireless communication unit.

11. The intelligent switch system of claim 10, wherein the coding is binary code, and the states of the plurality of the electrical switches are coded; wherein turn-on state expresses binary value 1, turn-off state expresses binary value 0, corresponding to the binary code.

12. A method for controlling intelligent switches is suitable for an intelligent switch system, wherein the intelligent switch system coupled between a live line and a zero line, comprises a cloud service platform, a wireless gateway, a plurality of single live line intelligent switches and a plurality of loads, each single live line intelligent switch is coupled to one of the plurality of loads in series between the live line and the zero line; wherein the single live line intelligent switch comprises a first wake-up unit, a first controller, a first wireless communication unit with a wake-up mode and a sleep mode, a switch unit, an energy storage unit, a first power access unit, a second power access unit, and the wireless gateway comprises a second controller, a second wireless communication unit, a second wake-up unit; the method for controlling intelligent switches comprising:
   a. detecting, by the second wireless communication unit, whether the cloud service platform sends a query signal to query use state of one of the plurality of loads or change one of the plurality of loads;
   b. generating a wake-up signal with a central frequency according to the query signal when the second wireless communication unit receives the query signal, the second controller;
   c. coupling, by the second wake-up unit, the wake-up signal with the central frequency to a alternating current power source network formed by the live line and the zero line;
   d. receiving, by the first wake-up unit, the wake-up signal with the central frequency from the alternating current power source network, and converting the wake-up signal with the central frequency into a resonant voltage signal to wake up the first wireless communication unit in the sleep mode;
   e. sending, by the first wireless communication unit in the wake-up mode, the use state of one of the plurality of loads and a control update request signal to the second wireless communication unit;
   f. feeding back, by the second wireless communication unit, a control signal to the first wireless communication unit when the second wireless communication unit receives the control update request signal from the first wireless communication unit;
   g. analyzing, by the first controller, the control signal from the first wireless communication unit, wherein when the first controller determines that the control signal is a request for changing the state of a corresponding load, the procedure goes to h, when the first controller determines that the control signal is a request for querying the use state of a corresponding load, the procedure goes to h;
   h. controlling, by the first controller, the switch unit on or off, then sending, by the first wireless communication unit, the on or off state of the corresponding load to the second wireless communication unit; or
   i. sending, by the first wireless communication unit, the use state of the corresponding load to the second wireless communication unit.

13. The method of claim 12, further comprising receiving state information of the corresponding load by the second wireless communication unit, and feeding back the state information of the corresponding load to user by the cloud service platform.

14. The method of claim 12, wherein the intelligent switch system further comprises a local switch, and the method further comprises controlling the switch unit on or off to change the corresponding load by the first controller when the first controller detects one press on the local switch.

15. The method of claim 12, wherein the second controller stores a list of coding, name and location information corresponding to the plurality of loads and the central frequency corresponding to the coding, and the first controller determines the central frequency corresponding to one of the plurality of loads, to generate the wake-up signal with the central frequency.

16. The method of claim 15, wherein only the first wake-up unit that has a resonant frequency equal to the central frequency of the wake-up signal converts the wake-up signal into the resonant voltage signal to wake up the first wireless communication unit.

17. The method of claim 12, wherein the energy storage unit coupled to the first wireless communication unit is configured to supply power to the first wireless communication unit in the wake-up mode, and when the switch unit is turned on, both the first power access unit and the second power access unit change the energy storage unit, when the switch unit is turned off, the first power access unit.

18. The method of claim 13, wherein the state information contains a corresponding load current, a corresponding load voltage, a corresponding load power, and a corresponding load temperature.

* * * * *